US012265012B2

(12) United States Patent
Haliyo et al.

(10) Patent No.: US 12,265,012 B2
(45) Date of Patent: Apr. 1, 2025

(54) DEVICE FOR DETERMINING THE POSITION OF TRAPPED OBJECTS IN OPTICAL TWEEZERS

(71) Applicants: Sorbonne Université, Paris (FR); Centre National de la Recherche Scientifique, Paris (FR)

(72) Inventors: Sinan Haliyo, Paris (FR); Stéphane Régnier, Paris (FR); Edison Gerena, Paris (FR)

(73) Assignees: Sorbonne Université, Paris (FR); Centre National de la Recherche Scientifique, Paris (FR)

( * ) Notice: Subject to any disclaimer, the term of this patent is extended or adjusted under 35 U.S.C. 154(b) by 156 days.

(21) Appl. No.: 18/250,514

(22) PCT Filed: Oct. 29, 2020

(86) PCT No.: PCT/IB2020/001125
§ 371 (c)(1),
(2) Date: Apr. 25, 2023

(87) PCT Pub. No.: WO2022/090761
PCT Pub. Date: May 5, 2022

(65) Prior Publication Data
US 2023/0400402 A1 Dec. 14, 2023

(51) Int. Cl.
*G01N 15/1434* (2024.01)
*G02B 21/00* (2006.01)
*G02B 21/32* (2006.01)

(52) U.S. Cl.
CPC ..... *G01N 15/1434* (2013.01); *G02B 21/0088* (2013.01); *G02B 21/32* (2013.01)

(58) Field of Classification Search
CPC ....... G01N 15/1434; G01N 2015/1415; G01N 15/10; G02B 21/0088; G02B 21/32;
(Continued)

(56) References Cited

U.S. PATENT DOCUMENTS

2005/0122579 A1 6/2005 Sasaki
2008/0316575 A1 12/2008 Curtis et al.
(Continued)

FOREIGN PATENT DOCUMENTS

DE 102006049126 A1 4/2007
JP 2001194591 A 7/2001
(Continued)

OTHER PUBLICATIONS

Foreign Communication from a Related Counterpart Application, Japanese Office Action dated Jul. 30, 2024, Japanese Application No. 2023525105 filed on Jul. 6, 2023.
(Continued)

*Primary Examiner* — Georgia Y Epps
*Assistant Examiner* — Monica T Taba
(74) *Attorney, Agent, or Firm* — Conley Rose, P.C.

(57) ABSTRACT

The present invention relates to a device for determining the position of a plurality of objects that are simultaneously trapped by a single laser beam, characterized in that the device comprises:—a laser source for emitting a laser beam, an actuation system for a three-dimensional deflecting of the laser beam between several trapping points,—a microscope objective for focusing the laser beam coming from the actuation system on the trapping points,—a sample chamber including the objects to be trapped on the trapping points,—a light source for lighten the sample chamber, and—a camera for determining the position of each of the trapped objects, said camera being located between the laser source and the actuation system, so that the light emitted by the light source passes successively through the sample chamber, the microscope objective, the actuation system and the camera.

10 Claims, 6 Drawing Sheets

(58) Field of Classification Search
CPC .. G02B 21/36; G02B 26/0841; G02B 26/105; G02B 21/361; G02B 21/02; G02B 21/08; G02B 21/14; G02B 21/245; G02B 21/26; G02B 21/365; G02B 26/06; G02B 26/0833; G02B 27/46; G21K 1/006; B01L 3/502761; B01L 2400/0454
See application file for complete search history.

(56) References Cited

U.S. PATENT DOCUMENTS

| | | | | |
|---|---|---|---|---|
| 2018/0024342 A1* | 1/2018 | Biebricher | ........... | G02B 27/106 250/459.1 |
| 2021/0041346 A1* | 2/2021 | Wang | ................ | G01N 15/1433 |

FOREIGN PATENT DOCUMENTS

| | | |
|---|---|---|
| JP | 2004230528 A | 8/2004 |
| JP | 2005337730 A | 12/2005 |
| JP | 2012159335 A | 8/2012 |
| JP | 2016218282 A | 12/2016 |
| WO | 2005114151 A1 | 12/2005 |
| WO | 2022090761 A1 | 5/2022 |

OTHER PUBLICATIONS

Foreign Communication from a Related Counterpart Application, International Search Report and Written Opinion dated Jul. 8, 2021, International Application No. PCT/IB2020/001125 filed on Oct. 29, 2020.

Gerena, et al., "High-Bandwidth 3-D Multitrap Actuation Technique for 6-DoF Real-Time Control of Optical Robots," IEEE Robotics and Automation Letters, vol. 4, No. 2, Apr. 2019, pp. 647-654, DOI: 10.1109/LRA.2019.2892393.

Gerena, et al., "Improving Optical Micromanipulation with Force-Feedback Bilateral Coupling," 2020 IEEE International Conference on Robotics and Automation (ICRA), May 31, 2020, pp. 10292-10298, DOI: 10.1109/ICRA40945.2020.9197424.

* cited by examiner

DEVICE FOR DETERMINING THE POSITION OF TRAPPED OBJECTS IN OPTICAL TWEEZERS

CROSS-REFERENCE TO RELATED APPLICATION

The present application is a filing under 35 U.S.C. 371 as the National Stage of International Application No. PCT/IB2020/001125, filed Oct. 29, 2020, entitled "DEVICE FOR DETERMINING THE POSITION OF TRAPPED OBJECTS IN OPTICAL TWEEZERS", which is incorporated herein by reference in its entirety for all purposes.

The present invention is related to a device for determining the position of a plurality of objects that are simultaneously trapped by a single laser beam. In particular, the device according to the invention makes it possible to determine the external forces applied to the objects.

Optical tweezers (originally called single-beam gradient force trap) are scientific instruments that use a highly focused laser beam to provide an attractive or repulsive force (typically on the order of piconewtons), depending on the relative refractive index between particle and surrounding medium; these forces can be used to physically hold and move microscopic objects, in a manner similar to tweezers. They are able to trap and manipulate small particles, whose size is typically in microns, including dielectric and absorbing particles. Optical tweezers have been particularly successful in studying a variety of biological systems in recent years.

Figure 1:
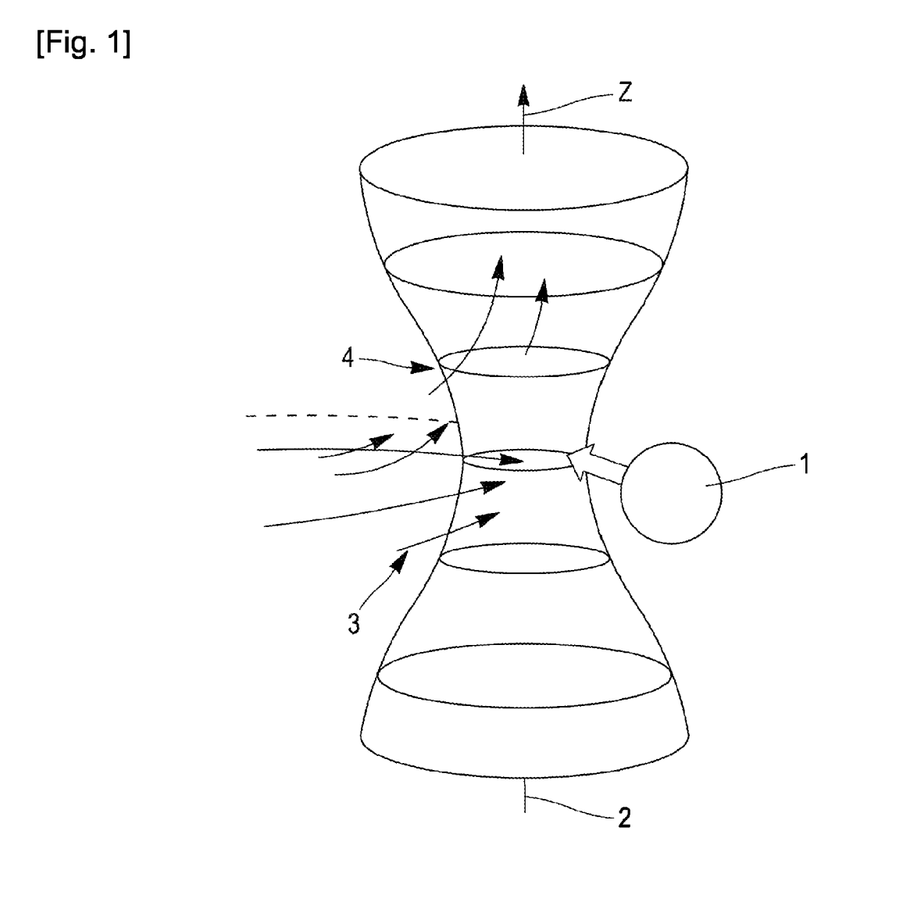
FIG. 1, previously described, is a schematic view of an optical tweezer.
Figure 2:
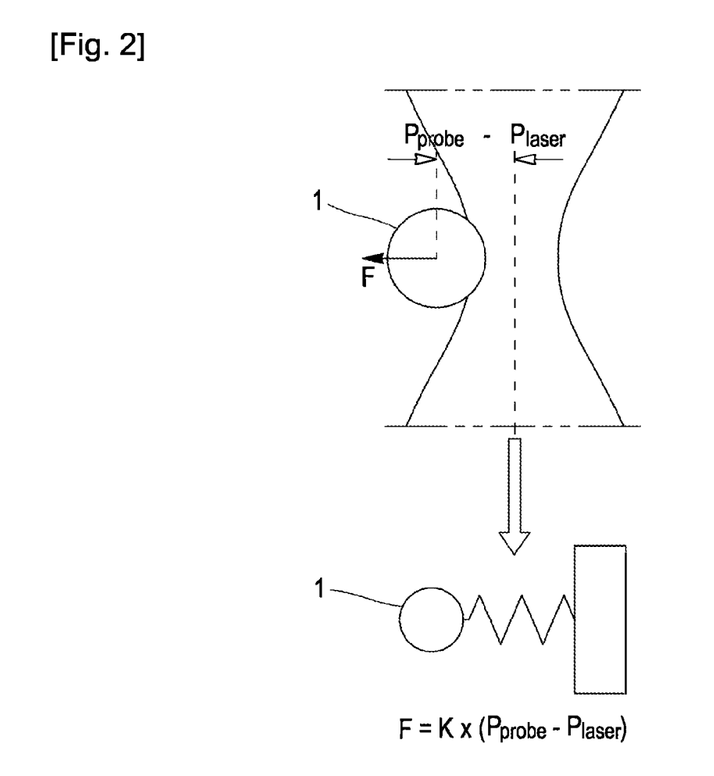
FIG. 2, previously described, illustrates the determination of the external force applied to the object trapped in the optical tweezer of FIG. 1, FIG. 3 schematically represents a device for determining the position of trapped objects in optical tweezers according to the invention.

As shown in FIG. 1 and FIG. 2, optical tweezers are capable of manipulating nanometer and micron-sized dielectric particles 1 by exerting extremely small forces via a highly focused laser beam 2 extending along an optical axis Z. The beam 2 is typically focused by sending it through a microscope objective. The narrowest point of the focused beam, known as the beam waist, contains a very strong electric field gradient 3. Dielectric particles are attracted along the gradient to the region of strongest electric field, which is the center of the beam. The laser light also tends to apply a force on particles in the beam along the direction of beam propagation. This is due to conservation of momentum: photons that are absorbed or scattered by the tiny dielectric particle impart momentum to the dielectric particle. This is known as the scattering force 4 and results in the particle being displaced slightly downstream from the exact position of the beam waist, as seen in FIG. 1.

In an optical trap, the tightly focused laser beam provides equilibrium position near the beam waist. When the trapped objects 1 are laterally or axially displaced away from the equilibrium position, the optical forces act to pull it back towards the equilibrium position. For small displacements, the force applied to the particle is a linear function, and the optical trap can be compared to a simple spring system, which follows Hooke's law. In this model the restoring optical force F is proportional to the distance from its equilibrium position, and the trap stiffness is proportional to the light intensity. Considering the motion range and the trap stiffness, three-dimensional pica-Newton resolution is reachable.

This particularity has led to the use of optical trapping for quantitative force measurements, such as the strength of inter-molecular bonds, the stiffness of a cell membrane or intracellular measurements for micro-rheology.

Force calibration of arbitrary objects with reasonable accuracy is still a challenge as the optical stiffness depends on several factors such as the material properties, the refractive index of both object and environment, the sizes and shapes of trapped objects etc. For these reasons, silicon or polystyrene microspheres are often used as a force probe to indirectly manipulate and sense the force during micromanipulation tasks. By using artificial microbeads which are uniform in material and shape, the optical force applied on the microbead can be obtained.

For small displacements, the optical force can be described by a spring model:

$$F = K^*(P_{laser} - P_{probe})$$

Where $P_{laser}$ and $P_{probe}$ represent the laser and the particle 1 position respectively. F is the three-dimensional optical force. K $[K_x, K_y, K_z]$ is the trap stiffness where $K_x$, $K_y$, $K_z$ represent the stiffness in x, y, and z direction respectively. Therefore, the optical force F is obtained by measuring the particle's displacement from the equilibrium trap position.

Well-established methods exist for precise stiffness calibration, as equipartition method and Stokes' drag method. Hence, force sensing directly stems from the capability to detect the position of the laser and the one of the trapped objects.

The determination of this position can be done by image-based position detection where the images of video cameras are used to extract the information, or by interferometric methods where beam displacements after the laser passes through the sample are measured via quadrant photodiode QDP.

The displacement in optical tweezers systems can be achieved by moving the platform or moving the laser beam, referred as passive actuation or active actuation.

In passive-actuation the incorporation of a motorized stage allows dynamic control of the sample chamber, while the manipulated object remains fixed on the trap.

In active-actuation, the laser direction is changed through active optical components. In addition, it is possible to multiplex the trapping laser beam in order to simultaneously trap several objects using a unique laser source. By rapidly deflecting the laser beam between several trap positions, it is possible to trap several objects, in such a way that the objects do not have time to spread between two laser visits. These methods are referred as time-shared methods. Or by using active diffractive optical elements such as Spatial Light modulators (SLM), several traps can be dynamically controlled creating a number of diffraction spots at different positions, referred as spatial—shared methods.

In quantitative force measurements with optical tweezers, the passive methods are usually used as the optical trap is maintained fixed, and only the trapped object position information is needed.

The invention is to perform the position and thus the force measurement for all traps created by a three-dimensional multi-trap actuation system expanding the force measurements capabilities to several traps.

To this end, the invention aims to provide a device for determining the position of a plurality of objects that are simultaneously trapped by a single laser beam.

The device according to the invention comprises:
- a laser source for emitting a laser beam, an actuation system for a three-dimensional deflecting of the laser beam between several trapping points,
- a microscope objective for focusing the laser beam coming from the actuation system on the trapping points,
- a sample chamber including the objects to be trapped on the trapping points,
- a light source for lighten the sample chamber, and an image sensor (for instance a camera) for determining the position of each of the trapped objects, said image sensor being located between the laser source and the actuation system, so that the light emitted by the light source passes successively through the sample chamber, the microscope objective, the actuation system and the image sensor.

The actuation system controls the three-dimensional position of the objects. As the image sensor is placed between the laser source and the actuation system and the actuation system is reversible, the image obtained by the image sensor is always aligned with the laser spot. Then by tracking the three-dimensional position of each object it is possible to obtain the three-dimensional force information of several traps similar as was performed in passive-actuation methods.

The actuation system can include a deformable mirror for controlling the axial positions of the trapping points. The wording "axial" refers to the axis of the laser beam. The planar scanning mirror can be a mirror galvanometer.

The deformable mirror can typically focus or defocus the laser beam axially.

The device can comprise a system for passing the laser beam emitted by the laser source several times through the deformable mirror.

Thus, by passing the laser beam several times through the same deformable mirror, the focalisation (in the case of a converging configuration of the deformable mirror) or the defocalisation (in the case of a diverging configuration of the deformable mirror) is amplified and therefore the angle of the laser beam at the entrance of the microscope objective is increased (in the case of a diverging configuration of the deformable mirror) or decreased (in the case of a converging configuration of the deformable mirror). Thus, the axial position of the trapping points can be increased (in the case of a diverging configuration of the deformable mirror) or decreased (in the case of a converging configuration of the deformable mirror). The invention allows the high-speed motion control of the trapping points in a large working space. As the device is still solely based on mirrors the light path is bidirectional, the path is independent from the propagation direction, and the optical efficiency is maximized. This property allows the simultaneous trapping of objects in the axial direction and the visualization of trapped objects in the axial plane, as the illumination light returns along the same path as the manipulation laser.

Thus, the actuation axis workspace can be enlarged by using several "virtual" deformable mirrors in series. The idea is to pass the laser beam several times through the same deformable mirror using for instance a set of mirrors. By ensuring that virtual deformable mirrors are placed on conjugate planes of the entrance aperture of the objective, it is possible to increase considerably the workspace, while ensuring that the size of the laser beam diameter at the entrance aperture of the objective remain the same, regardless the degree of convergence or divergence of the laser beam.

The working space, the number of traps that can be created and the maximum applicable force are increased. It could be used to simultaneously manipulated or stimulated several biological and synthetic objects in a large 3D working space. This actuation technique is also useful in different applications where the 3D orientation of microscopic objects (biological or synthetic) is needed, such as cell surgery applications (e.g. nuclear transplantation, embryo micro-injections, polar-body biopsy), 3D tomographic imaging of living samples, or micro-assembling in microfluidic devices.

The system for passing the laser beam several times through the deformable mirror can comprise at least one set of two mirrors for guiding the laser beam between two successive passages of the laser beam on the deformable mirror.

The system for passing the laser beam several times through the deformable mirror advantageously comprises between two consecutive passages of the laser beam through the deformable mirror an afocal system for conjugating said two consecutive passages of the laser beam through the deformable mirror.

The afocal system can comprise two converging lenses.

The actuation system can include a planar scanning mirror for controlling the planar positions of the trapping points. The wording "planar" refers to a plan perpendicular to the axis of the laser beam. The planar scanning mirror can be a mirror galvanometer.

The device advantageously comprises a first afocal system placed between the deformable mirror and the planar scanning mirror and a second afocal system placed between the planar scanning mirror and the microscope objective, for conjugating the deformable mirror and the planar scanning mirror with the entrance aperture of the microscope objective.

The device can comprise a system for calculating the force on each trapped object as a function of the position of each of the trapped object determined by the camera.

The force F on each trapped object can be calculated by the system using the optical force model:

$$F=K*(P_{laser}-P_{probe})$$

wherein $P_{laser}-P_{probe}$ represents the displacement between the laser position and the position of the trapped object, K being the stiffness of the trap.

The force on the trapped object is the sum of the external forces that move the object from its equilibrium position, i.e. the sum of the external forces that move the object with the exception of the force applied by the laser beam.

The force and torque applied to a synthetic object with several objects attached to its body, can be calculated as a function of the force F on each trapped object.

The objects to be trapped can be biological objects, such as red blood cells and bacteria cells or synthetic objects such as optical robots (especially printed-design micro-structures with different types of end-effectors) which can be used to indirectly manipulate and measure forces. Thus, the objects to be trapped can be biological objects, microspheres or synthetic objects.

Other aims, features and advantages of the invention will emerge from reading the following description, given purely by way of non-limiting example, and with reference to the accompanying drawings in which.

Figure 3:
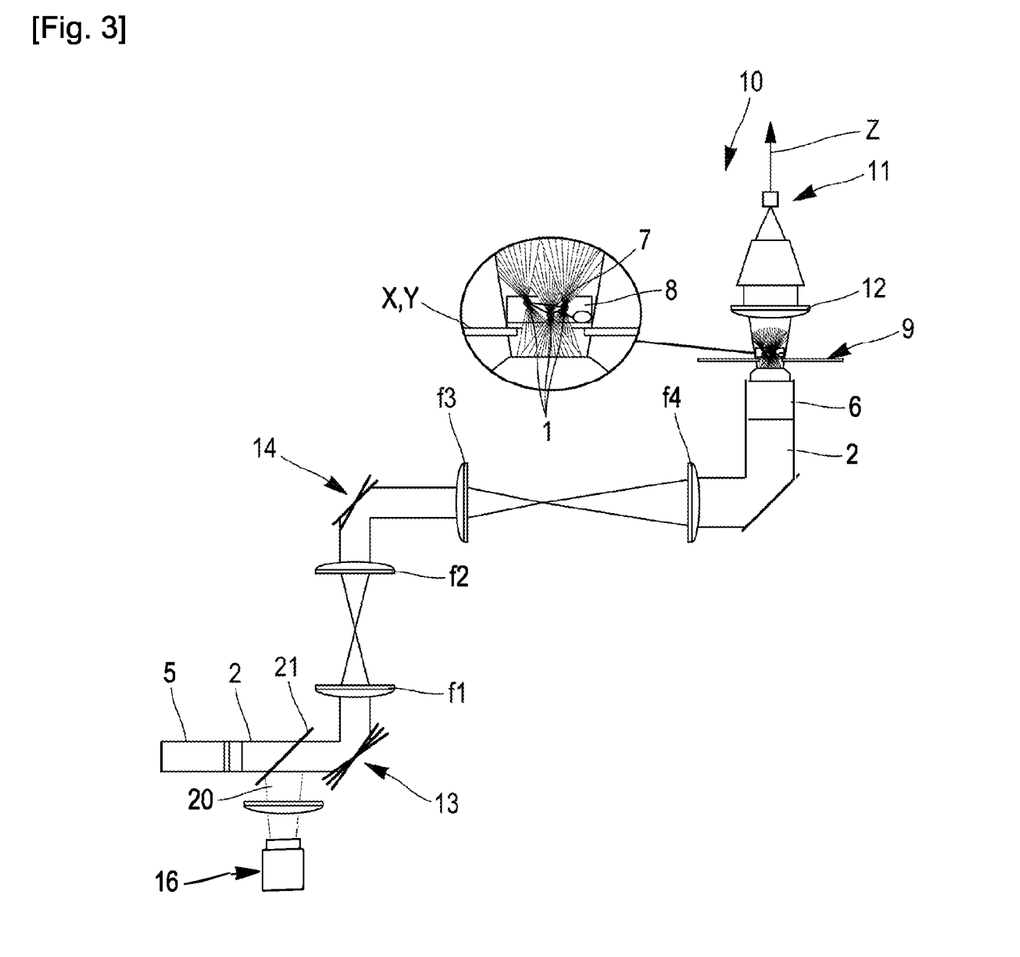

FIG. 3 illustrates a device 10 for determining the position of a plurality of objects 1 that are simultaneously trapped by a single laser beam 2 according to the invention.

The device 10 comprises a laser source 5 which emits a laser beam 2. The laser source 5 can be a 1070 nm laser. The stiffness of the trap depends on the laser power, and the output laser power usually used can be from 100 mW to 2 W.

The laser beam 2 passes through an actuation system for deflecting the laser beam 2 between several trapping positions. The generation of several simultaneously trapping points using a single laser source can be achieved using spatial or temporal sharing methods. Multiple stable trapping points can be created by rapidly deflecting a laser beam among a set of positions. The displacement in optical traps systems can be achieved by moving the platform or moving the laser beam, referred to as passive actuation or active actuation.

In passive actuation, the incorporation of a motorized stage allows dynamic control of the sample chamber, while the manipulated object remains fixed on the trap.

In active actuation, the laser direction is changed through active optical components. In addition, it is possible to multiplex the trapping laser beam in order to simultaneously trap several objects using a unique laser source. By rapidly deflecting the laser beam between several trap positions, it is possible to trap several objects, in such a way that the objects do not have time to spread between two laser visits. This method is referred to as time-shared method. Or by using active diffractive optical elements such as Spatial Light Modulators (SLM), several traps can be dynamically controlled creating a number of diffraction spots at different positions. This method is referred to as spatial-shared method.

A microscope objective 6 is used to focus the laser beam 2 coming from the actuation system on the trapping points and to image the trapped objects 1. The objects 1 of a sample 7 are disposed in a sample chamber 8 placed on a platform 9 (can be a three-dimensional nanostage).

A light source 11 is used to lighten the sample. The light source can be a LED (light-emitting diode).

The light 20 is focused on the sample 8 in the axial direction Z via a lens 12.

The actuation system controls the three-dimensional position of the objects 1, i.e. in the axial Z direction as well as in the planar X, Y directions. It includes a deformable mirror 13 and a galvanometer 14 which are used to control the axial Z and the planar X, Y positions of the trapping points respectively.

The deformable mirror 13 which can focus or defocus the laser beam 2 is used on the Z axis. The deformable mirror 13 and the galvanometer 14 are positioned in a conjugate plane on the entrance aperture of the microscope objective 6, Hence, the laser beam 2 will pivot around the entrance aperture of the microscope objective 6 and retain the same degree of overfilling, independently of the angle or the degree of collimation of the incident beam 2, producing equally and stable traps.

The deformable mirror 13 can be a microelectromechanical component with 111 actuators and 37 piston-tip-tilt segments with an update rate of more than 2 KHz. Each segment has 700 um diameter while the array has an aperture of 3. 5 mm and with a maximum dynamic range (Stroke) of 5. 8 um. Electrostatic actuation allows precise positioning of each segment with nanometer and microradian resolution (wavefront resolution<15 nm rms). The mechanical step-response speed is less than 200 us (10-90%) and has high reflectance (>99.9%).

The segmented deformable mirror 13 can effectively create smooth shapes, and it is used to control the degree of collimation of the laser beam 2. By synchronizing the orientation of the mirror galvanometer 14 and the motion of the deformable mirror 13, it is possible to displace the focal spot laterally and axially while maintaining the diffraction-limited performance. This axial scan implies a very low mechanical inertia, hence the Z bandwidth is compatible with the galvanometer 1. The overall switching speed between three-dimensional trap position is the same order of magnitude of equivalent two-dimensional systems in the prior art, Thus, it is possible to obtain very stable traps without introducing any significant aberrations.

Figure 5:
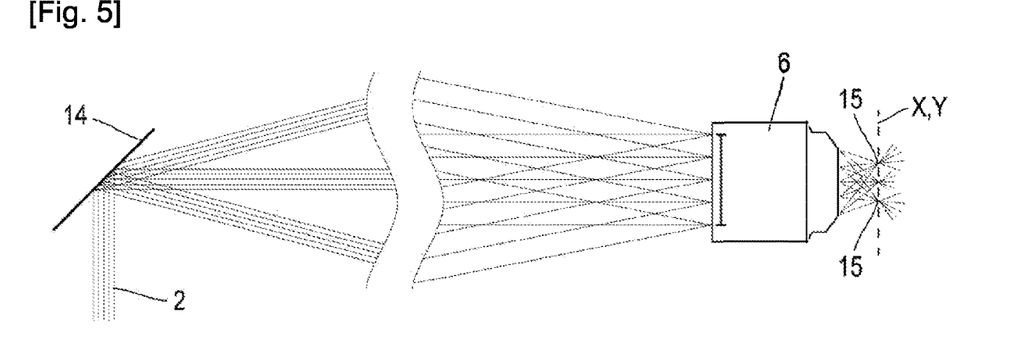

The Gaussian laser beam (1070 nm) is guided into the inverted microscope 6 through the galvanometer 14, the deformable mirror 13, and standard optical elements. Two afocal systems $f_1$, $f_2$ and $f_3$, $f_4$ are preferably used to conjugate the two actuators 13, 14 with the entrance aperture of the microscope objective 6 and to expand the laser beam 2. It is expanded in order to overfill (20%) the objective entrance to improve the trapping efficiency, FIG. 5 shows how the laser beam 2 will pivot around the microscope objective's entrance aperture for small movements of the mirror galvanometer 14 creating the motion of the optical trap in the optical plane and thus creating several trapping points 15.

Figure 6:
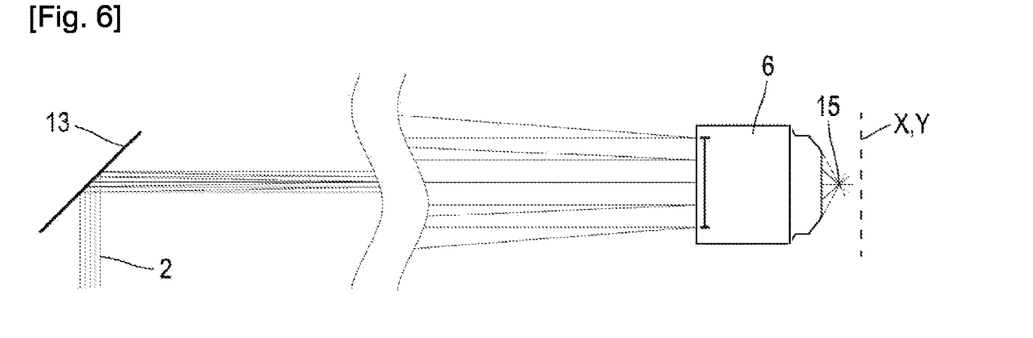
Figure 7:
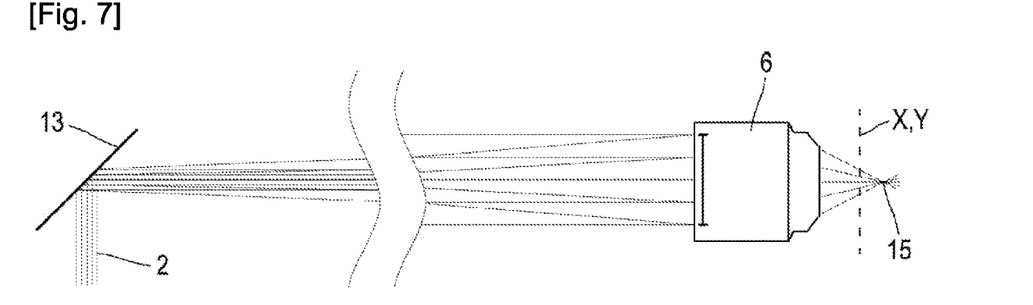

It is shown the effect of focusing (FIG. 6) or defocusing (FIG. 7) the deformable mirror 13 to change the Z position of the trapping points 15. The size of the beam 2 at the objective's entrance aperture remains the same, regardless of the degree of collimation of the incident beam.

According to the invention, an image sensor 16 for determining the position of each of the trapped objects 1 is located between the laser source 5 and the actuation system 13, 14, more precisely between the laser source 5 and the deformable mirror 13, so that the light emitted by the light source 11 passes successively through the sample 7, the microscope objective 6, the actuation system 13, 14 and is then guided via a dichroic mirror 21 to the camera 16. The image sensor can be an event-based camera.

Due to the fact that the actuation system 13, 14 only uses mirrors, the light pass is bidirectional, i.e. the path is independent from the propagation direction. Using this property and thanks to the specific location of the camera 16, it is possible to track the position of the trapped objects 1 by looking at one trapping point 15 at a time, where it three-dimensional position is, and as the objects 1 are always maintained in the center of the field of view of the camera 16.

Placing the camera 16 between the laser source 5 and the actuation system 13, 14, the white light 20 reaches and goes through the actuation system 13, 14 in the exact opposite direction from the laser beam 2. In this way the image on the sensor 16 is always cantered on the laser spot. In this configuration, only one sensor receives the measurement of all the scanned points. By synchronizing the multi-trap actuation technique and the event-based camera 16 (or other cameras), it will be possible to differentiate events (or frames) coming from different traps 15. This solution bypasses the problem of determining the center of the mobile laser in a multi-trap force measurement A tradeoff between spatial and temporal resolution may remain, as the totality of pixels are used to determine the position of each trapped object, but the time to take the measurements depends on the number of created traps and the scanning frequency. In this way, it is for instance possible to arbitrarily position in a space three different traps, while the sensor receives the information from all the scanned points, thus measuring the position with respect to the laser of each trapped object, and finally extracting the information of external forces for each trap.

This ability to measure force at multiple three-dimensional locations simultaneously is important in many biomechanical studies, such as characterizing the stiffness of the membrane of a cell at multiple points during a fusion phase or measure the stiffness at different cells simultaneously. Multi-trap force measurement will be also useful in the investigation of mechanotransduction, for example the cell adaptation to repetitive stimulations and clarify how cells change shape and control their migratory behavior.

Figure 8:
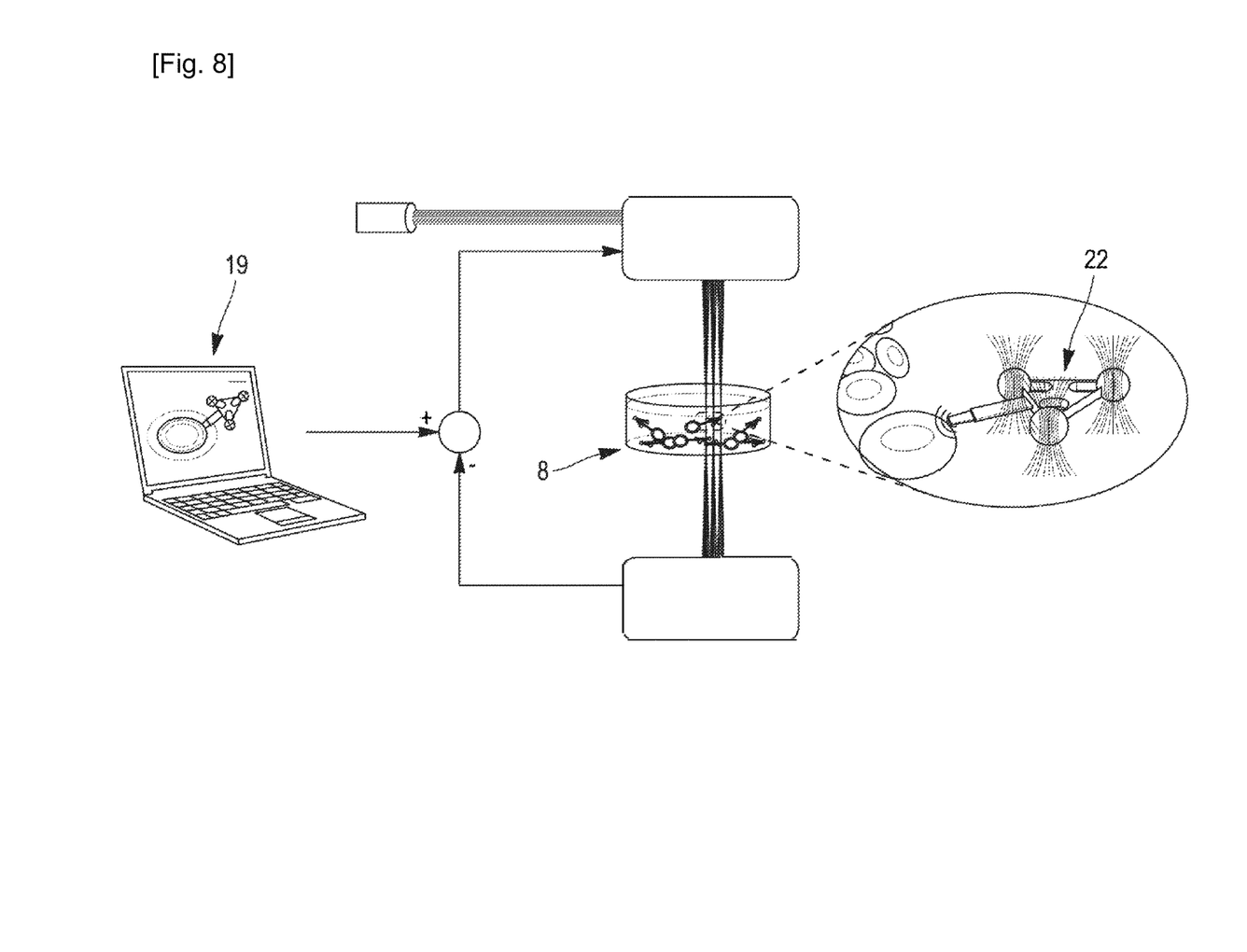
FIG. 8 is a diagram illustrating an optical robot associated with a device according to the invention.

Optical robots 22 are especially printed-design microstructures with different types of end-effectors, actuated in 6DoF (six degrees of freedom) by optical tweezers through spherical handles attached to its bodies (FIG. 8).

By measuring the three-dimensional force for each handle of the robots, a six-axis force/torque measurement can be performed by combining the information of each trap. These 6-DoF Optobots with a six-axis force sensor will allow the study of new biological interactions, such as the mechanism of Toxoplasma *gondii*. This latter requires mechanical work of translation and rotational twisting motion to complete cellular invasion, and therefore only characterizable with a six-axis force/torque sensor.

Figure 4:
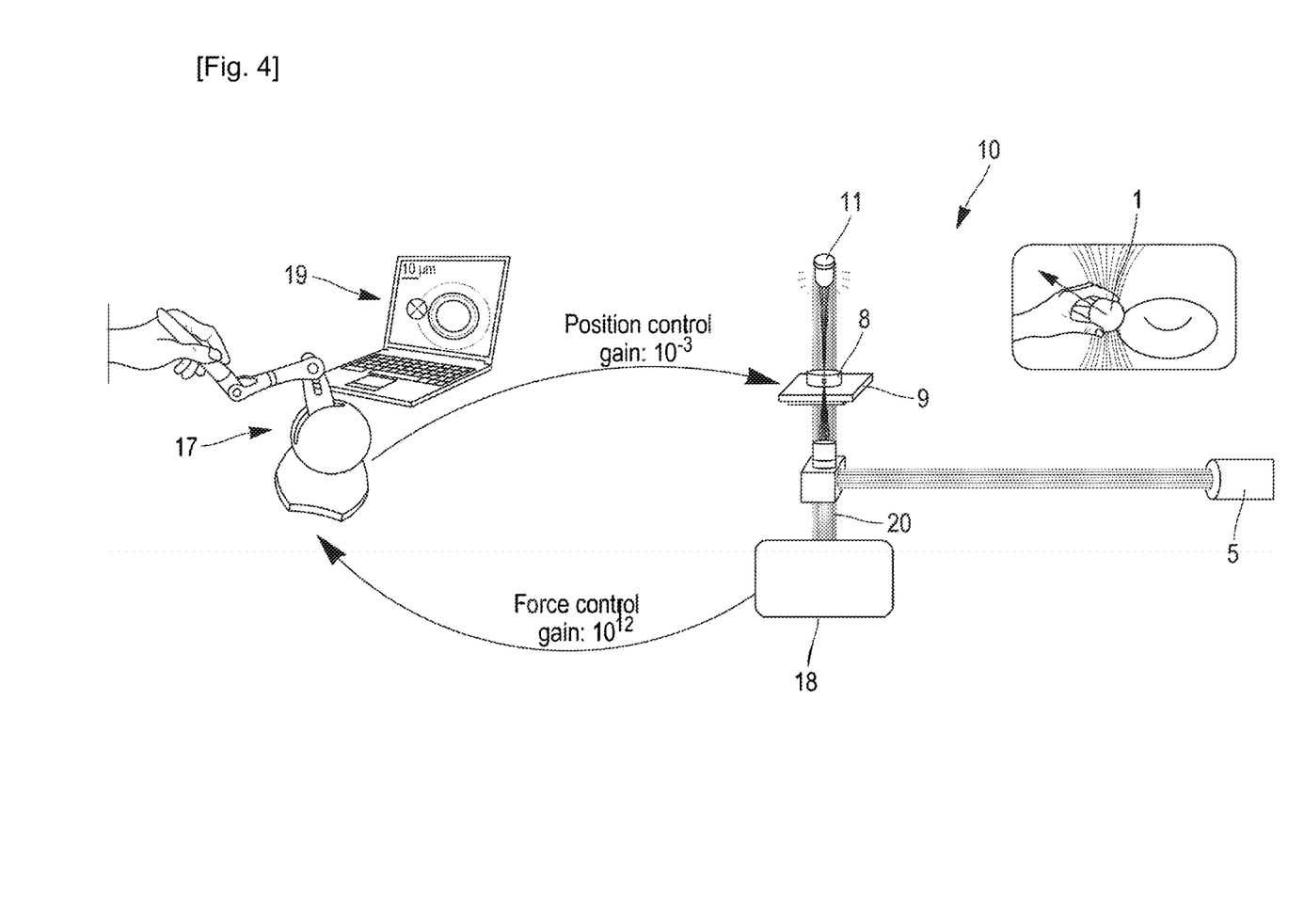
FIG. 4 is a diagram illustrating a haptic interface associated with a device according to the invention, FIG. 5 schematically illustrates a mirror galvanometer used in the device according to the invention, FIG. 6 and FIG. 7 schematically illustrate a deformable mirror used in the device according to the invention.

As illustrated in FIG. 4, a haptic interface 17 can be used. The user controls the three-dimensional position of the microrobot and feels the three-dimensional external forces F applied to it via a force sensor 18 that determines the force applied as explained above. A computer 19 makes it possible to have a visual perception and environment information to operators.

The invention claimed is:

1. Device for determining the position of a plurality of objects that are simultaneously trapped by a single laser beam, characterized in that the device comprises:
   a laser source for emitting a laser beam,
   an actuation system for a three-dimensional deflecting of the laser beam between several trapping points,
   a microscope objective for focusing the laser beam coming from the actuation system on the trapping points,
   a sample chamber including the objects to be trapped on the trapping points,
   a light source for lighten the sample chamber, and
   an image sensor for determining the position of each of the trapped objects, said image sensor being located between the laser source and the actuation system, so that the light emitted by the light source passes successively through the sample chamber, the microscope objective, the actuation system and the image sensor.

2. Device according to claim 1, characterized in that the actuation system includes a deformable mirror for controlling the axial (Z) positions of the trapping points.

3. Device according to claim 2, characterized in that the deformable mirror can focus or defocus the laser beam axially.

4. Device according to claim 2, characterized in that it comprises a system for passing the laser beam emitted by the laser source several times through the deformable mirror.

5. Device according to claim 1, characterized in that the actuation system includes a planar scanning mirror for controlling the planar (X, Y) positions of the trapping points.

6. Device according to claim 2, characterized it comprises a first afocal system ($f_1$, $f_2$) placed between the deformable mirror and the mirror galvanometer and a second afocal system ($f_1$, $f_2$) placed between the mirror galvanometer and the microscope objective, for conjugating the deformable mirror and the mirror galvanometer with the entrance aperture of the microscope objective.

7. Device according to claim 1, characterized in that it comprises a system for calculating the force (F) on each trapped object as a function of the position of each of the trapped object determined by the camera.

8. Device according to claim 7, characterized in that the force F on each trapped object is calculated by the system using the optical force model: $F=K*(P_{laser}-P_{probe})$, wherein $P_{laser}-P_{probe}$ represents the displacement between the laser position and the position of the trapped object, K being the stiffness of the trap.

9. Device according to claim 7, characterized in that the force and torque applied to a synthetic object with several objects attached to its body, is calculated as a function of the force (F) on each trapped object.

10. Device according to claim 1, characterized in that the objects to be trapped are biological objects, microspheres or synthetic objects.

* * * * *